Sept. 4, 1973    R. J. KASPER ET AL    3,756,870
INDUCTION HEATING METHOD OF CASE HARDENING CARBON STEEL ROD
Filed May 10, 1971    6 Sheets-Sheet 1

*INVENTOR.*
ROBERT J. KASPER
JAMES J. SNYDER
BY
*Meyer, Tilberry & Body*
ATTORNEYS

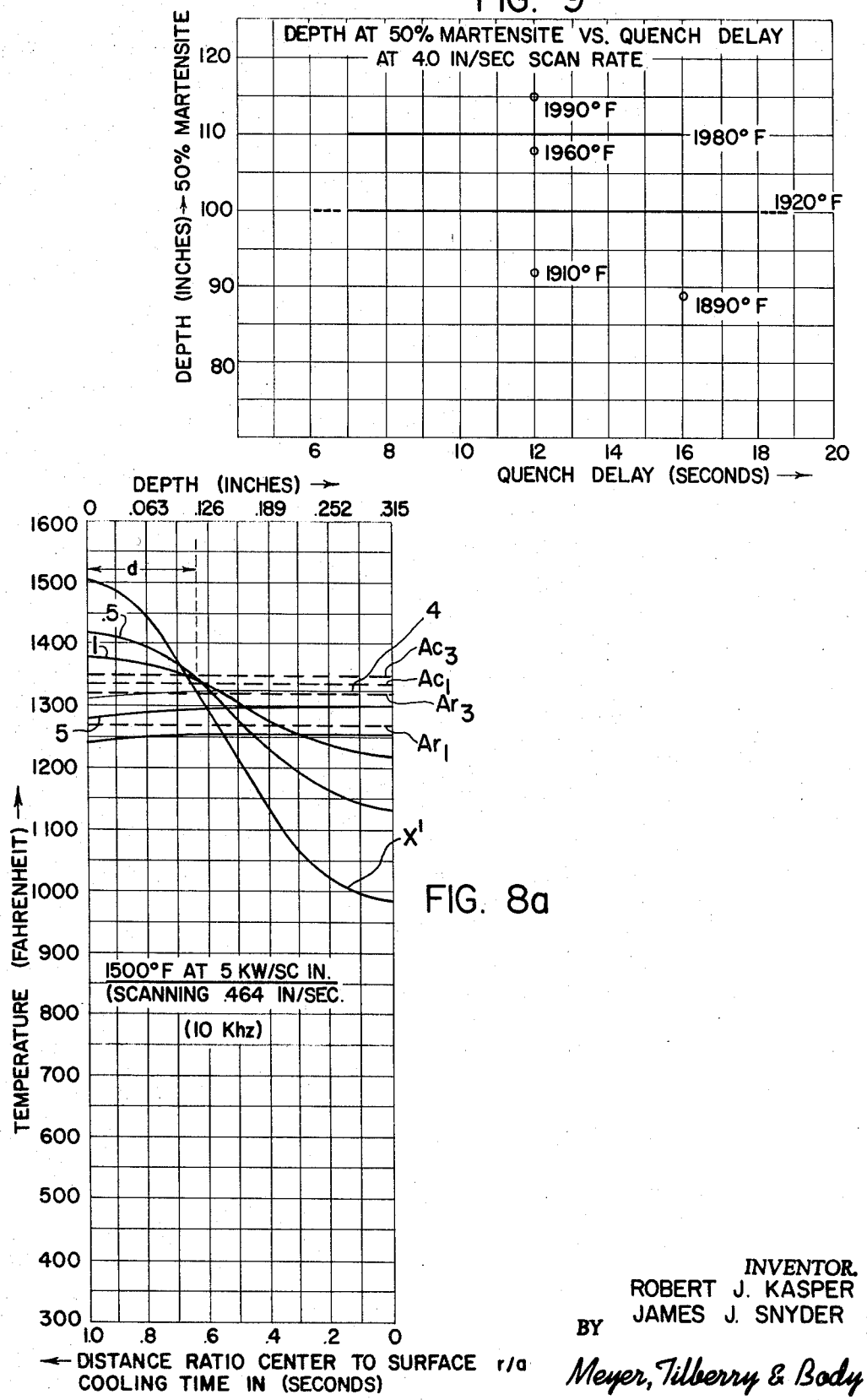

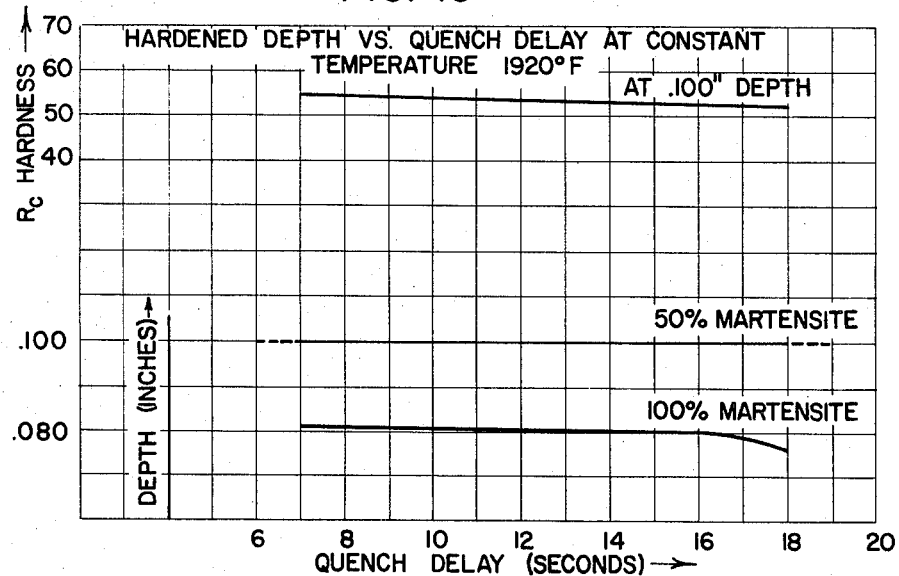
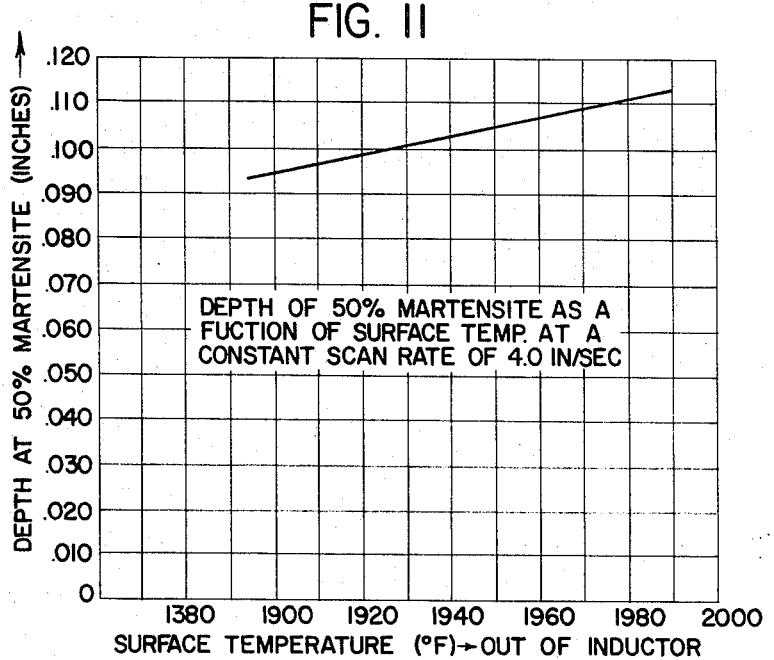

United States Patent Office … 3,756,870
Patented Sept. 4, 1973

3,756,870
INDUCTION HEATING METHOD OF CASE HARDENING CARBON STEEL ROD
Robert J. Kasper, Seven Hills, and James J. Snyder, Sagamore Hills, Ohio, assignors to Park-Ohio Industries, Inc., Cleveland, Ohio
Filed May 10, 1971, Ser. No. 141,677
Int. Cl. C21d 1/10
U.S. Cl. 148—150                           15 Claims

ABSTRACT OF THE DISCLOSURE

A method of case hardening to a desired depth a rod formed from carbon steel which method includes the steps of moving the rod longitudinally, inductively heating the rod at a rate that creates a heat profile within the rod which profile exceeds the upper critical heating transformation temperature adjacent the surface of the rod and to a depth generally corresponding to the desired depth to be hardened with the average temperature of the heating profile being less than the lower critical heating transformation temperature of the rod, allowing the rod to soak, and, then quenching the rod within less than about 50 seconds after the heating step.

---

This invention relates to the art of induction heating and more particularly to an induction heating method for use in case hardening carbon steel rods.

The present invention is particularly applicable for case hardening carbon steel rods and a process for producing coil springs and it will be described with particular reference thereto; however, it should be appreciated that the invention has much broader applications and may be used for case hardening carbon steel rods to be used in various applications.

In producing coil springs of the type used in automotive suspension systems, it has been somewhat common practice to form the springs into the desired configuration from an alloy steel rod and then heat-treat the coiled springs to produce a through hardened structure. In utilizing this process, relatively high grade alloy steel bars or rods must be employed to produce satisfactory results.

It has been suggested that a coil spring could be produced by passing a carbon steel rod through a multi-turn induction heating coil, then form the heated rod into a coiled configuration, and thereafter quench hardening the resulting spring. This process has not resulted in satisfactory operation because the rod forming the coiled spring would sometimes be hardened through the complete diameter and, in other instances, be completely soft throughout its entire diameter. Through hardening of the less expensive carbon steel results in a brittle spring, which is unacceptable. Thus, the use of carbon steel has presented substantial difficulties, even when using induction heating. All of these induction heating operations have involved the use of an inductor powered at a relatively low value, less than approximately 10 kilowatts per square inch at the surface of the rod being heated. At this low level of power, the speed of the rod passing through the inductor must be relatively low, i.e., less than one inch per second. Otherwise, the necessary heat energy cannot be absorbed by the rod to effect heating. All of these disadvantages have been overcome by the present invention which relates to a method of inductively heating a rod which is to be subsequently quench hardened to produce a hardened case thereon.

In accordance with the present invention, there is provided a method of case hardening to a desired depth a rod formed from carbon steel. This method comprises moving the rod longitudinally and inductively heating the rod at a rate which creates a preselected heat profile within the rod. This profile, when viewed in a cross-section of the rod, exceeds the upper critical heating transformation temperature adjacent the surface of the rod and to a depth generally corresponding to the desired depth to which the rod is to be hardened. Also, the profile is such that the average temperature of the profile when integrated over the diameter of the rod is less than the lower critical heating transformation temperature of the rod. By heating the rod in this manner, it has been found that a substantial time delay can occur between the heating operation and a subsequent quench hardening operation, without destroying the capabilities of the rod to be subsequently case hardened by rapid quenching. During this time delay, it is possible to form the rod into any shape, such as a coil spring.

In accordance with the invention, the power density of the coil at the surface of the rod is relatively high, i.e. exceeding about 30 kilowatts per square inch of the rod subjected to the coil. In this manner, the speed at which the rod passes through the coil can be greatly increased. Also, at higher speeds, the surface temperature of the rod can be higher without appreciable decarburization of the surface.

In accordance with another aspect of the present invention, the above described method is used in forming the coil spring wherein the rod is coiled into a series of longitudinally spaced, repeating convolutions prior to the quenching operation.

The term "carbon steel" is used herein to indicate any steel which has sufficient carbon to allow hardening by quenching operation after heating. In practice, this carbon content is .30 parts by weight or greater in the steel being processed.

In the past it has been generally assumed in the induction heating art that a small diameter rod, less than 1.00 inch could not be successfully case hardened by a process using induction heating with a delay before quenching, for several reasons. First, if the rod were heated by a lower power density, a substantial amount of time would be required to create the necessary heat. Because of the small diameter of the rod, the heat conductivity of the rod would cause the center portion to be heated to a temperature above the hardening temperature prior to the time required for applying sufficient heat energy to the rod. If the rod were then immediately quench hardened, it would be hardened throughout. If there was a time delay, the temperature would decrease more rapidly at the surface and produce, if anything, a hardening core. If too much time delay was experienced, then both the core and surface would be reduced below the critical lower cooling transformation temperature ($Ar_1$) which would result in a completely soft rod after quenching. There was no reason to assume that this phenomenon could, in any way, be overcome by using higher power densities at the surface of the rod. The same type difficulties would apparently be encountered. The present invention primarily relates to a method whereby the heating profile from the outside to the inside of the rod is created with certain characteristics which allow a time delay between heating and quenching, which time delay does not allow the core of the workpiece to be heated above the critical upper heating transformation temperature ($Ac_3$) during the cooling which is effected by a time delay between heating and quenching.

The primary object of the present invention is the provision of a method of case hardening a carbon steel rod by induction heating, which method is uniform in operation and avoids both hard cores and soft cases.

Another object of the present invention is the provision of a method of case hardening a carbon steel rod by passing the rod through an induction heating coil and quenching subsequent thereto.

Yet another object of the present invention is the provision of a method of case hardening a carbon steel rod by inductively heating the rod in a manner to create a decaying heat profile in the rod, which profile causes only the metal adjacent the rod surface to exceed the critical upper heating transformation temperature during the heating and subsequent cooling of the rod.

Yet another object of the present invention is the provision of a method as defined above wherein the power density at the surface of the rod exceeds approximately 30 kilowatts per square inch of rod surface and wherein a higher surface temperature can be used without appreciable decarburization.

These and other objects and advantages will become apparent from the following description taken together with the accompanying drawings in which:

FIG. 8a is a graph showing a characteristic of a lower power density application of the present invention; and, FIGS. 9–11 illustrate properties of a rod case hardened in accordance with the present invention.

Figure 1:
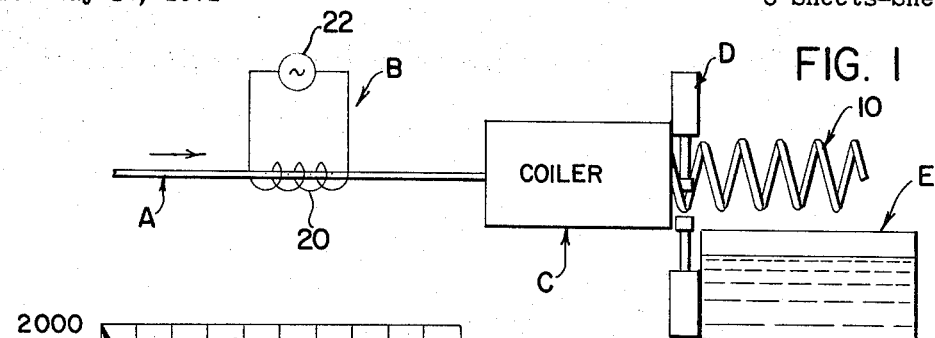
FIG. 1 is a schematic view illustrating one use of the present invention.

Referring now to the drawings wherein the showings are for the purpose of illustrating the present invention and not for the purpose of limiting the same, FIG. 1 shows, schematically, an apparatus for performing the present invention. A carbon steel rod A having a diameter of less than 1.0 inch and preferably in the range of .300–.750 inch is moved longitudinally through an induction heating station B and into a somewhat standard spring coiling device C. The coil can be powered at various frequencies; however, a frequency of approximately 3 kc. to 10 kc. is preferred. The coiling device forms the heated rod into the coil spring 10 which is cut to lengths by schematically represented cutting device D. After being cut to length, coil spring 10 is dropped into a quenching tank E for substantially instantaneously quenching the previously heated rod forming the spring 10. The present invention relates to a method for heating and quenching the rod A to form a case hardened outer surface for the rod.

The invention can best be described in connection with FIGS. 2 and 3. A coil 20 heats the outer surface of the rod A inductively and creates within the rod an original heat profile shown in the generally vertical dashed line of FIG. 3. An arithmetic proximation of this heat profile is shown as curve X in FIG. 3. The abscissa of FIG. 3 is the ratio $r/a$ where $r$ is the actual radius of the rod and $a$ is the radial distance outwardly from the center of the rod. The center of the rod is indicated at point O. Consequently, the profile X is only one half of the actual profile through the rod with the other half being identical. After the rod has been heated to create the heat profile X, the heating operation is discontinued. Thereafter the heat profile starts to decay because of radiation cooling.

The lines marked (1)–(20) represent the decaying heat profile within the rod after the seconds indicated within the circles. In other words, after about 5 seconds, in the example shown in FIG. 3, the heat profile is substantially horizontal. Thereafter, as time passes, the heat profile drifts slowly in a downward direction while retaining this general horizontal disposition. Because of radiation loss and the inertia due to the conductivity of the metal forming the rod, this drifting is somewhat more rapid at the surface of the rod than it is at the center of the rod.

As is well known, carbon steel has several critical points or heat transformation points. These standard points, as found in text books, are referred to as:

Upper heating transformation temperature $Ac_3$
Lower heating transformation temperature $Ac_1$
Upper cooling transformation temperature $Ar_3$
Lower cooling transformation temperature $Ar_1$ Stabilized temperature Ms (Martensite start temperature)

Three of these transformation temperatures are shown in FIG. 3. The depth to which the rod A is to be case hardened is represented as $d$ on FIG. 3. In accordance with the invention, the original heat profile X is selected so that the metal to the distance $d$ is heated above the upper heating transformation temperature $Ac_3$. Also, the heated average temperature found by integrating the profile X is less than $Ac_1$. In this manner, during the decaying action, the first horizontal disposition of the decaying heat profile will be less than $Ac_1$. In this manner, as the profile decays from its original profile X to the horizontal profile represented by (5) only metal to a depth substantially corresponding to the desired depth $d$ has come above the $Ac_3$ transformation point or temperature. In the example shown in FIG. 3, the material is 1066 carbon steel; therefore, the $Ac_1$ lower heating transforation temperature is about 1340° F. This is only 10° below the $Ac_3$ critical temperature. Because the points are relatively close, the heating profile as it decays does not alloy metal substantially below the desired depth $d$ to exceed the lowest heating critical temperature $Ac_1$. This provides a core of material which has not been heated during the soaking or time delay cycle to above heating critical temperatures which will cause austenite to form. In accordance with the present invention, a time delay can be employed after the original heating without substantially affecting the resulting case hardened depth. This is seen in FIG. 3 wherein the horizontal decaying heat profile is moving gradually down as time elapses. If the quenching takes place before the generally horizontal profile moves below the lower cooling transformation temperature $Ar_1$, rapid quenching at that time forms martensite within the outer portions of the rod which have been subjected to temperatures exceeding the heating critical points $Ac_1$ and $Ac_3$. By considering FIG. 3, if the quenching takes place between 12 and 20 seconds, case hardening will result. If time delay of about 20 seconds is allowed, the surface temperature of the rod has decreased below the lower cooling critical temperature $Ar_1$; therefore, quenching would cause a soft pearlitic outer case. This is completely unacceptable.

Figure 2:
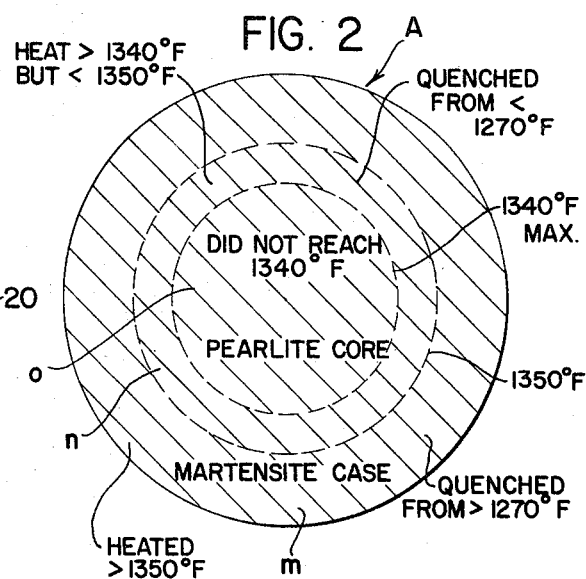
FIG. 2 is an enlarged cross-sectional view taken through a rod case hardened in accordance with the present invention.
Figure 3:
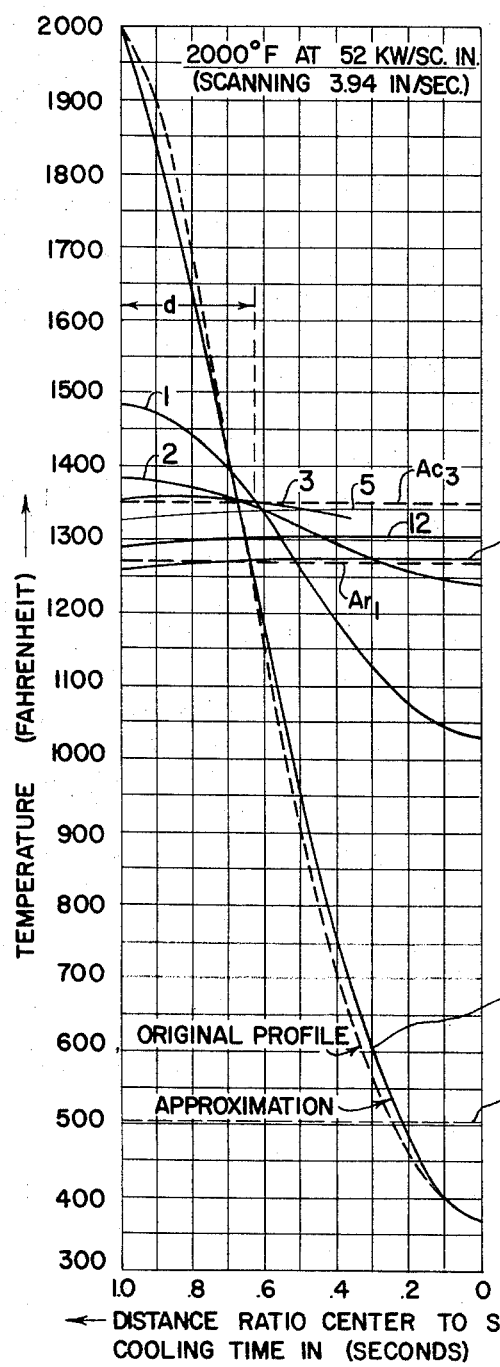
FIG. 3 is a graph showing a decaying heat profile used to describe the present invention.

If the quenching takes place in about 12 seconds, and by extrapolation in less than about 15 or 16 seconds, the case hardening structure as shown in FIG. 2 will be obtained. In this figure, the outer portion $m$ relates to a portion of the rod which has been heated to a temperature exceeding the upper heating transformation temperature $Ac_3$. The inner core O has not been heated to a temperature exceeding the lower heating transformation temperature $Ac_1$; therefore, upon quenching it remains a soft pearlitic core. In between these two portions, band $n$ is realized. In this band, the metal has exceeded the lower heating transformation temperature $Ac_1$, but has not exceeded the upper heating critical transformation temperature $Ac_3$. This produces a combined structure of martensite, pearlite and other transformation products which are to an extent less hard than the outer portion $m$.

In accordance with the present invention, by providing an initial heat profile X wherein the outer portion of the rod is heated above the heating critical temperature $Ac_3$ and the average temperature of the integrated curve is less than the lower heating critical temperature $Ac_1$, there can be a time delay in the quenching operation as long as the time delay does not allow the profile to dip below the lower cooling transformation temperature $Ar_1$. This time delay is necessary to allow the rod to be moved from the heating station to a quenching station. Since the allowable time delay has a substantial magnitude, it is possible to employ an intemediate forming operation, such as coiling the rod into a spring configuration before quenching.

This method is primarily useful in hardening small diameter rods such as rods less than an inch in diameter. At these small diameters, the thermal inertia of the rod throughout its thickness is relatively small; therefore, if the average temperature under the integrated heat profile is greater than the lower critical transformation temperature $Ac_1$, the rods will be heated throughout to a temperature sufficient to cause hardening. Quenching thereafter would cause a brittle rod and be outside the scope of the present invention. For this reason, it has been generally considered impossible to inductively heat a rod and quench harden the same with any assurance of uniform results.

Figure 4:
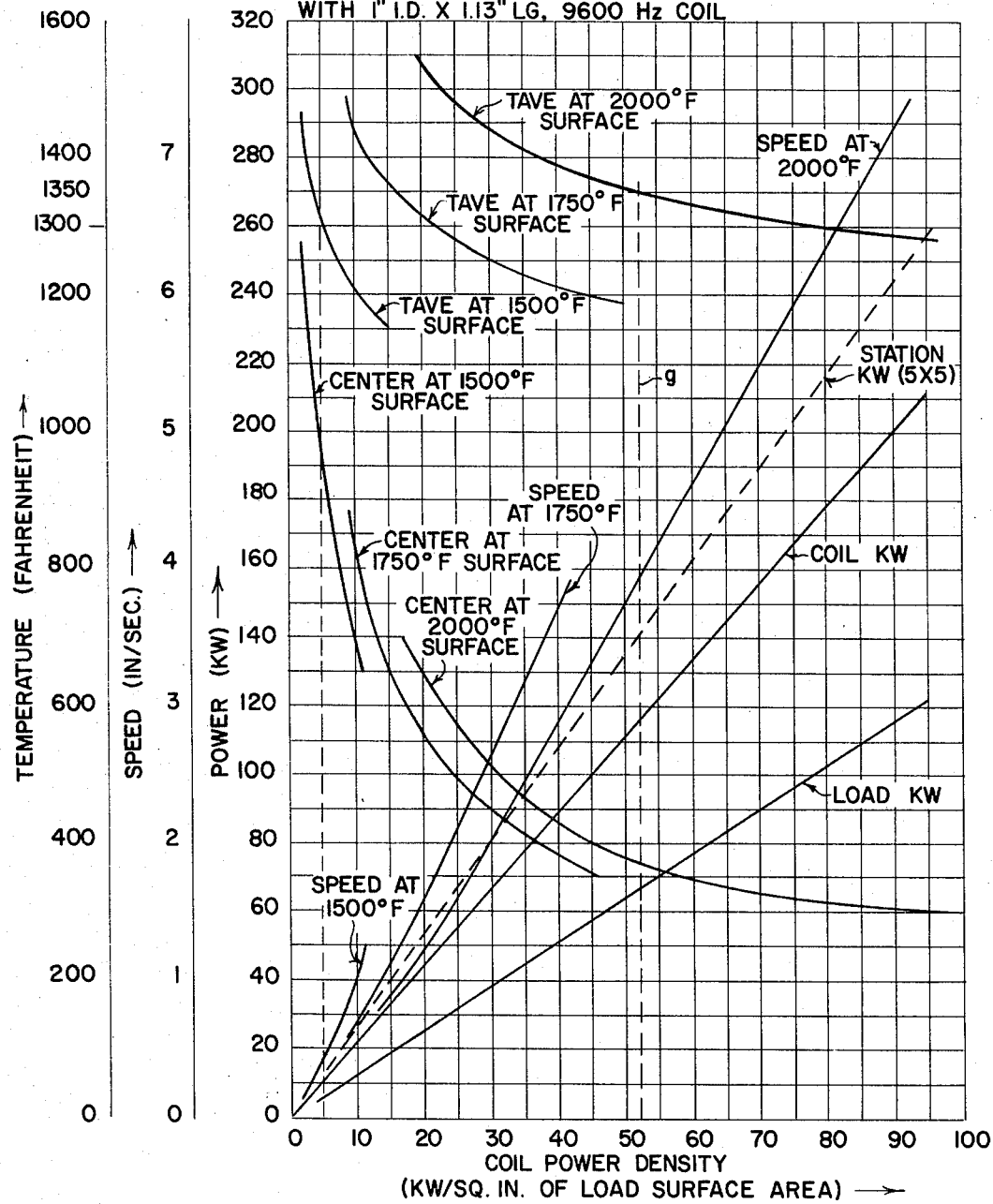
FIG. 4 is a composite graph showing various parameters from which information may be taken to practice the present invention.

Referring now to FIG. 4, this composite graph illustrates parameters of a method practiced in accordance with the present invention with an induction coil having an internal diameter of 1.00 inch and a length of 1.13 inches, which inductor is energized to a frequency of 9600 c.p.s. Also, this graph is for a rod of SAE 1066 carbon steel having a diameter of .630 inches. The abscissa of this graph is in power density per area at the rod's surface. A discussion of this graph will show certain aspects of the present invention. By way of example, assume that a power density of 52 kilowatts per square inch is selected. This density is represented by the vertical dashed line $g$. Assume that a surface temperature of 2000° F. is to be employed, line $g$ intersects the average temperature line at just below 1350. This means that the average temperature under the heating profile curve will be less than the upper heating critical temperature $Ac_3$. It is noted that if a lower power were used for the same surface temperature (i.e. 2000° F.), the average temperature would exceed the upper heating critical temperature. This would cause through hardening of the rod upon subsequent quenching.

It is advisable to select an average temperature which is close to but below the lower heating critical temperature $Ac_1$ since this feature will increase the time delay before the profile drifts downwardly below the lower cooling critical temperature $Ar_1$. The line $g$ intersects the speed line for 2000° F. at about 4 inches per second. Consequently, the speed of the rod to provide the desired results should be at this value. Line $g$ intersects the station power line at 142 kilowatts. This is the power at the station. In a like manner, line $g$ intersects a coil power line at about 115 kilowatts. This would be the power of the coil. The power of the load is about 65 kilowatts which when taken together with the length of the coil and the surface of the rod exposed to the coil will produce a power density at the rod surface of 52 kilowatts per square inch. The last parameter taken from FIG. 4 is the temperature at the center of the rod. This is found on the 2000° F. center curve to be about 375° F. The temperature values found from inspection of FIG. 4 can also be found in the profile X of FIG. 3.

From the contour of the average temperature curve and the center temperature curve, it is seen that as the power density at the load decreases, these two temperatures become closer for a selected surface temperature. This indicates a flattening of the initial profile. When the initial profile is flattened, the average temperature is reached more rapidly during decay. As soon as the average temperature is reached, the time to progress below the lower cooling transformation temperature $Ar_1$ is substantially constant. Consequently, with a flatter profile, the total time delay is reduced. If this reduction is drastic, it is difficult to quench the small diameter rod in sufficient time to cause case hardening. Indeed, there would not be sufficient time to insert an intermediate forming step between heating and quenching. Also, as the power goes down, the speed at which the rod must pass through the induction heating coil is substantially reduced. This reduction in speed causes inherent delay between the heating step and the quenching step. This inherent delay can be sufficient to preclude case hardening in itself. Consequently, in accordance with the present invention, it is preferred to use a higher power density to produce a more steep heat profile and higher surface temperature, which will allow an increased time delay before quenching is required to assure a hardened case on the rod. Also, this increased power allows an increase in the speed of the rod to increase the productivity of the total operation.

Since the initial heat profile X must be selected with certain parameters in producing the present invention, the following mathematical representation of the decaying heat profile in a rod is submitted:

$$Tr/a = \frac{P_7}{2} \sum_{n=1}^{\infty} e^{-T\alpha n^2} B \cdot C \cdot \frac{J_0(\alpha_n r/a)}{D \cdot J_0 \alpha_n}$$

wherein: $P_7$ = power parameter $(P_2 \cdot 2a/K)$ of initial wave $T$ = time parameter $\left(\frac{Kt^2}{dca^2}\right)$ of final wave $B = B_4 + B_3/Z_3$ $B_4 = 4T' + \frac{1}{2} \frac{-4}{\alpha_n^2} + \frac{2}{C}$ $B_3 = \frac{2 \cdot Z_2}{Z} - 1 - z4 \cdot B_2$ $B_2 = \frac{1}{32} - \frac{1}{2\alpha_n^2} + \frac{2}{\alpha_n^4} + \frac{B_1}{C}$ $B_1 = \frac{1}{8} - \frac{1}{\alpha n^2}$ $Z_3 = \eta Z \cdot Z_1$ $C = ah$ $D = C^2 + \alpha_n^2$ $a$ = radius of cylindrical load, in.
$c$ = mean specific heat of load, W. sec./lb. deg. F.
$d$ = density of load, lb./cu. in.
$e$ = 2.7183 constant
$h$ = surface (boundary) radiation factor = $H/K$, in.$^{-1}$
$H$ = surface conductance, W./sq. in, deg. F./in.
$J_0(\alpha_n)$ = zero order Bessel function of $\alpha_n$
$J_1(\alpha_n)$ = first order Bessel function of $\alpha_n$
$K$ = thermal conductivity, W./sq. in. deg. F./in.
$n$ = summation integer
$P_0$ = total power induced at load surface, W./sq. in.
$P_2$ = net power generated in the load, W./sq. in.
$r/a$ = dimensionless distance ratio, variable.
$t$ = total time of cooling, variable, sec.
$T' = T_1/P_7$, average temperature factor for initial temperature wave
$Tr/a$ = temperature variation with respect to distance $r/a$
$Z$ = argument of round load, constant = $\sqrt{2}a/D_2$
$Z_1$ = Ber $Z$ Ber$'$ $Z$+Bei$'$ $Z$, constant
$Z_2$ = Ber $Z$ Bei$'$ $Z$−Bei $Z$ Ber$'$ $Z$, constant
$Z_3 = \eta Z \cdot Z_1$, constant
$\alpha, \alpha_n$ = roots of general boundary equation
$\eta$ = thermal efficiency of heating, $P_2/P_0$ The above mathematical representation of the heat profile curve which decays as time elapses, is submitted for completeness of this disclosure; however, it should be used as only a general mathematical representation of the heat profile which is to be used in practicing the present invention.

Figure 5:
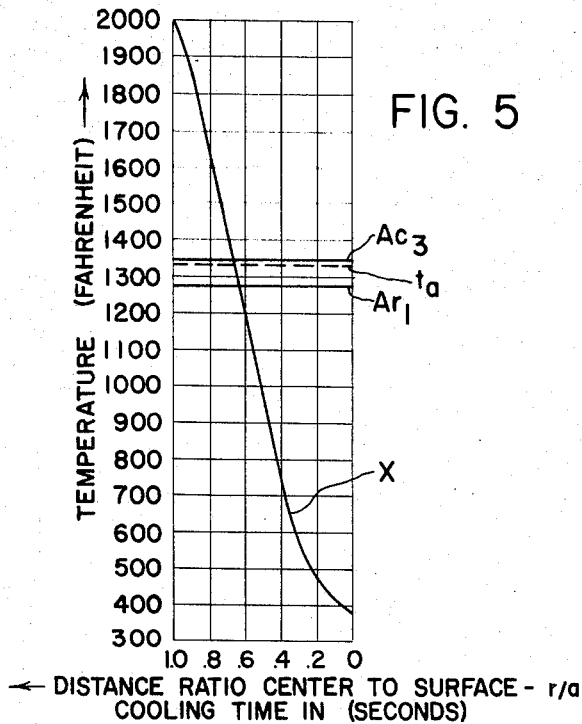
FIG. 5 is a simplified version of the graph illustrated in FIG. 3.
Figure 6:
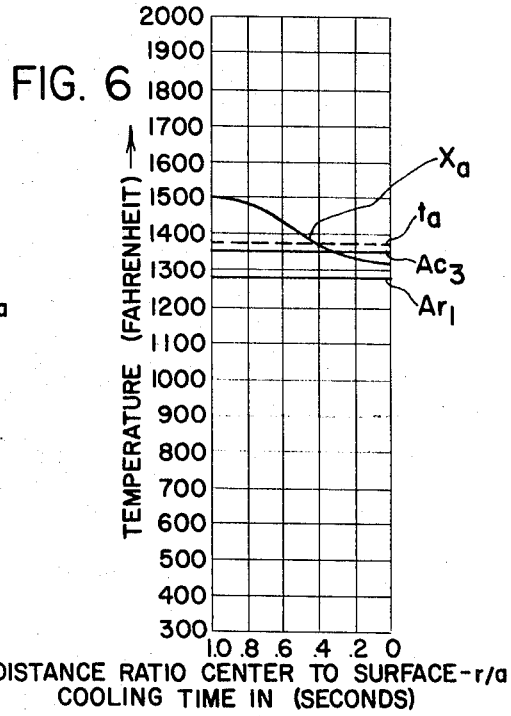
FIGS. 6 and 7 are graphs similar to FIG. 5 and illustrating heat profiles coming outside the scope of the present invention.
Figure 7:
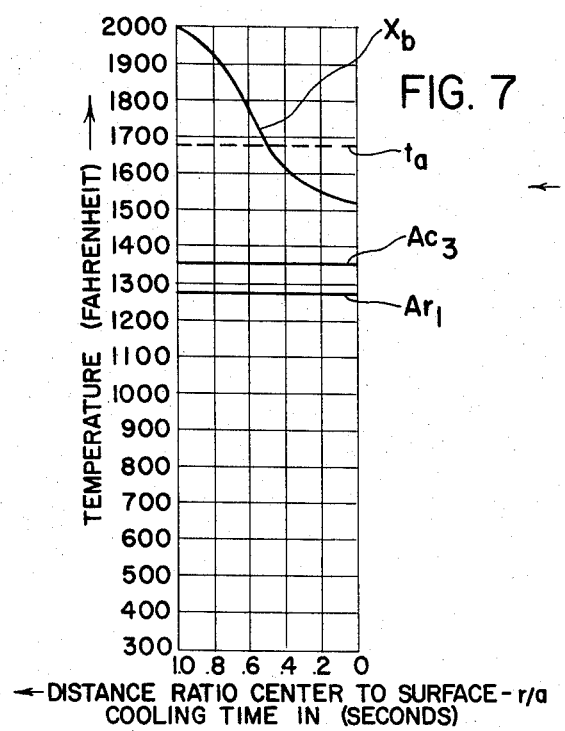

Referring now to FIG. 5, this figure is a simplified version of FIG. 3 showing the profile X and the average temperature $t_a$ as being just below the upper heat transformation temperature $Ac_3$. Referring now to FIG. 6, a lower power curve is illustrated. It is noted that this curve of profile $X_a$ is relatively flat. When such a flat curve is used, even with a low surface temperature of 1500° F., the average temperature $t_a$ generally exceeds the upper critical transformation temperature $Ac_3$. Consequently, this rod could be through hardened if quenched before the profile $X_a$ reached below a cooling transformation temperature $Ar_1$. To use a low temperature, it would be necessary to decrease the input power to reduce the temperature $t_a$. This would result in a corresponding decrease in efficiency, and, thus, productivity. In FIG. 7, another relatively low power installation is illustrated. In this case, profile $X_b$ produces a surface temperature which is selected to correspond with surface temperature in FIG. 5. When this happens, the average temperature $t_a$ is substantially above the upper heating transformation temperature $Ac_3$. Consequently, again through hardening will take place and the grain size at the surface will be increased because of longer time at high temperature.

Figure 8:
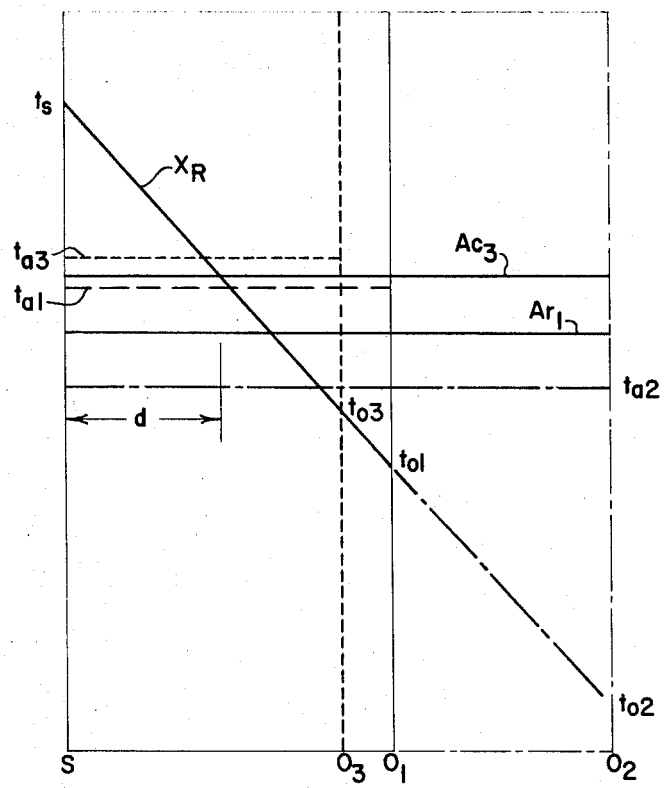
FIG. 8 is a graph showing a principle employed in the present invention.

Referring now to the graph in FIG. 8, another operating characteristic of the present invention is illustrated. Assuming that a heat profile $X_R$ is provided in a rod having a surface S and a center $O_1$, the average temperature $t_{a1}$ would be below the upper heating transformation temperature $AC_3$ as shown in the solid line portion of FIG. 8. The profile is determined by the heating operation and the metallurgical properties of the rod. In this instance, the profile $X_R$ intersects the upper heating transformation temperature $Ac_3$ at approximately the desired depth $d$. This desired depth of case hardening is generally uniform irrespective of the diameter of the rod being case hardened. Generally the case is to be in the neighborhood of .100–120 inches. If the diameter of the rod is increased, the profile $X_R$ remains substantially the same with the centermost temperature $T_{02}$ at the centermost portion $O_2$ of the rod. This causes the average temperature to be substantially decreased, as represented by $t_{a2}$. If this decrease is substantial, it can be below the lower cooling transformation temperature $Ar_1$. Consequently, the rod will be soft. If the diameter is decreased to the position $O_3$, the average temperature $t_{a3}$ can be substantially increased to above the upper critical transformation temperature. In this case, the total rod will be hardened. Consequently, to obtain a hardened case in the neighborhood of .100–.120 inches, selected heat profiles determine the maximum and minimum rod diameters are in the range of .300–.750 inches in the practice of this invention. It can be seen that the desired depth can be obtained in a smaller diameter rod if the heat profile is more steep in a vertical direction. This requires an increased power density. Also, it results in a higher surface temperature. If surface temperatures exceed about 2000° F., decarburization can occur at the surface. This would be detrimental to satisfactory hardening of the rod. This limits the lower diameter size of the practical application of the present invention. Going the other way, in order to maintain a relatively fixed casing depth as the diameter of the rod increases, the heat profile must be less steep. When this happens, there is a substantial reduction in the available time before quenching. Also, the increased mass of such rods can result in a substantially faster decrease in the surface temperature of the rod. This can cause a soft surface. All of these factors are considered in practicing the present invention. For this reason, a rod diameter in the range of .300–.750 inches has been selected as preferred.

Referring now to FIG. 8a, there is illustrated a relatively gradual profile X' and its subsequent decayed position. It is seen that by providing this gradual profile, resulting from a low power density of the workpiece, there is a substantial decrease in the available time before quenching is mandatory. Since the workpiece must be moved relatively slowly in a lower power density application, the time delay allowed may be insufficient for proper quenching. This is even more aggravated when an intermediate forming step, such as coiling a spring, must be performed.

EXAMPLE

As an example of the present invention, a rod of SAE 1066 carbon steel having a diameter of 0.63 inches was heated by a coil with an internal diameter of 1.0 inch and a length of 1.13 inches and powered at 10 kc. The rod was moved past the inductor at a speed of 4.0 inches per second, and the power station registered a power of 142 kilowatts. A delay of 12.0 seconds before substantially instantaneous quenching developed the following properties:

(1) Surface temperature ($t_s$) _____° F__ 1990
(2) 100% martensite depth _____inches__ .085
(3) 50% martensite depth _____do____ .115
(4) Heat affected depth _____do____ .300
(5) Power density at the load _____ kw./in.$^2$__ 64

This rod was produced in accordance with the decaying heat profile shown in FIG. 3 wherein the published critical temperatures or points are as follows:

° F.
(1) Upper critical heating point ($Ac_3$) _____ 1350
(2) Lower crtical heating point ($Ac_1$) _____ 1340
(3) Upper critical cooling point ($Ar_3$) _____ 1325
(4) Lower critical cooling point ($Ar_1$) _____ 1270

This data indicated that, upon heating, the rod will begin to transform from a mixture of pearlite and ferrite into a mixture of austenite and ferrite at 1340° F., and then into pure austenite at 1350° F. The amount of material transformed is a function of the length of time that the material is held above these two critical temperatures. Upon cooling below 1325° F., the material will begin to transform back from austenite to a mixture of austenite and ferrite, and thence back into a mixture of pearlite and ferrite below 1270° F. Consequently, the rod was heated over 1350° F. to a depth of 0.115 in ($r/a = .63$). This accounts for the presence of 50% martensite (the hardest transformation product of austenite) was observed at a depth of 0.085 inch ($r/a = 0.73$). The surface material within this 0.085 inch depth was held above 1350° F. for at least three seconds, while the material between the depths 0.085 inch and 0.115 inch was above 1340° F. for about three seconds. This can account for the decrease in martensite between this range of depths.

Once formed, austenite continues to possess the ability to transform to martensite (hard) rather than pearlite (soft) until it cools down to 1270° F., which would occur at the surface of the rod in 16 seconds of radiation cooling as generally indicated in FIG. 3. After this time, the material will revert back to its original soft condition. This example shows a successful quench delay of 12.0 seconds, although a delay of 15 seconds would also be acceptable.

The heat effected depth was observed at 0.300 inch. The entire rod to this depth reached the lower critical point ($Ac_1$), i.e. 1340° F. for a short period of time. This accounts for the slight presence of transformed austenite to this depth. The water quench process employs a tank with an appropriate agitator and is particularly instantaneous with respect to the metallurgical transformation for the rod.

A rod was hardened in accordance with this example and the Rockwell C hardness at various depths for four separate samples of the rod was found to be as follows:

| Depth | .025 | .050 | .075 | .100 | .125 | .150 |
|---|---|---|---|---|---|---|
| Sample I | 64 | 67 | 67 | 62 | 52 | 45 |
| Sample II | 65 | 66 | 67 | 61 | 52 | 45 |
| Sample III | 63 | 66 | 66 | 62 | 52 | 46 |
| Sample IV | 66 | 66 | 66 | 63 | 52 | 44 |

This shows a uniformity of the process described in this example and verifies the applicability of the method disclosed herein for case hardening a steel rod.

Referring now to FIG. 9, this graph illustrates the depth of 50% martensite for varying quenching time when the rods are heated to a surface temperature of 1980° F. and 1920° F. It will be seen that for a quench delay time of 16 seconds, the depth of 50% martensite remains substantially constant. This corresponds to the above description of the present invention. FIG. 10 illustrates that for a surface temperature of 1920° F., martensite .100 inch remains substantially constant for varying delays before quenching. This chart also shows that the 100% martensite depth starts to decrease after a quench delay of about 16 seconds. This is due to the fact that as the horizontal heat profile drifts downward the outer surface cools somewhat more rapidly than the inner surface. A similar graph is shown in FIG. 11 wherein the hardness depth of the rod varies from about .095 to .115 for varying surface temperatures. This is brought about by the fact that as the surface temperature increases, the intersection of the initial heat profile with the upper heating transformation temperature $Ac_3$ moves inwardly from the workpiece.

The charts and illustrations of this application are based on actual experimentation and they result from particular coil sizes, workpiece sizes and other selected parameters. However, they do explain and illustrate the method contemplated by the present invention which has application to various selected parameters. In quenching the rod, it is done instantaneously to a temperature below temperature Ms (martensite start temperature). Of course, quenching should be continued to the lower transformation temperature Mf (martensite finish) to assure maximum martensite in a short time. Since this application has been described with respect to certain transformation temperatures, the following chart illustrates the transformation temperatures of certain carbon steels.

| SAE number | On heating, 50° F. per hr. | | On cooling, 50° F. per hr. | | |
|---|---|---|---|---|---|
| | $Ac_1$, °F. | $Ac_3$, °F. | $Ar_3$, °F. | $Ar_1$, °F. | Ms, °F |
| 1,030 | 1,340 | 1,495 | 1,450 | 1,250 | 752 |
| 1,050 | 1,340 | 1,375 | 1,340 | 1,265 | 555 |
| 1,066 | 1,340 | 1,350 | 1,325 | 1,270 | 501 |

Having thus defined our invention, we claim:

1. A method of case hardening to a desired depth $d$ a carbon steel rod of a diameter less than 1.0 inch and having a known upper heating transformation temperature $Ac_3$, a known lower heating transformation temperature $Ac_1$, a known upper cooling transformation temperature $Ar_3$, a known lower cooling transformation temperature $Ar_1$, and a known stabilized martensite finish temperature Mf, said method comprising the steps of:
   (a) passing the steel rod longitudinally through the central opening of an induction heating coil;
   (b) energizing said coil with a known flux density;
   (c) controlling the speed of said rod as it moves through said coil to produce a heat profile within said rod, said profile having a surface temperature $t_s$, and a centermost temperature $t_0$ with the profile exceeding the upper heating transformation temperature $Ac_3$ to a depth approximately corresponding with said desired depth $d$ and the average temperature being less than the lower heating transformation temperature $Ac_1$;
   (d) allowing said rod to soak whereby said profile decays to a generally uniform temperature throughout said rod; and
   (e) then, rapidly quenching said rod below said stabilized martensite start temperature Ms within a time from said heating step less than that required for the profile to decay less than the lower cooling transformation temperature $Ar_1$.

2. The method as defined in claim 1 wherein said flux density exceeds about 30 kilowatts per square inch of the surface of said rod exposed to said coil.

3. The method as defined in claim 1 wherein said rod has a diameter less than about 1.000 inch.

4. The method as defined in claim 1 wherein said surface temperature $t_s$ is in the range substantially above said upper transformation temperature $Ac_3$ and approximately 2000° F.

5. The method as defined in claim 1 wherein said desired depth is less than approximately .110 inch.

6. The method as defined in claim 1 wherein said centermost temperature is greater than about 350° F. and less than said upper cooling transformation temperature $Ar_3$.

7. The method as defined in claim 1 wherein said flux density exceeds about 50 kilowatts per square inch at the surface of said rod exposed to said coil.

8. The method as defined in claim 7 wherein said rod speed exceeds about 3.5 inches/second.

9. The method as defined in claim 1 wherein said soaking does not exceed about 15 seconds.

10. A method of case hardening to a desired depth a rod having a diameter less than 1.0 inch and formed from carbon steel, said method comprising the following steps:
   (a) moving said rod longitudinally;
   (b) inductively heating said rod at a rate that creates a heat profile within said rod which profile exceeds the upper critical heating transformation temperature adjacent the surface of said rod and to a depth generally corresponding to said desired depth with the average temperature of said heating profile being less than the lower critical heating transformation temperature of said rod;
   (c) allowing said rod to soak whereby said profile decays to a generally uniform temperature throughout said rod; and,
   (d) quenching said rod within less than about 15 seconds of said heating step.

11. The method as defined in claim 10 wherein said rod is moved at a rate exceeding about 3.5 inches/second.

12. The method as defined in claim 10 wherein said rod has a diameter less than about 1.000 inch.

13. A method of making a coil spring from a rod of carbon steel, said method comprising the following steps:
   (a) longitudinally moving a rod of carbon steel having a diameter less than 1.000 inch;
   (b) inductively heating said rod by a power density of over about 30 kilowatts per square inch of the surface of said rod as it is being heated at a rate that creates a heat profile within said rod which profie exceeds the upper critical heating transformation temperature adjacent the surface of said rod and to a depth generally corresponding to said desired depth with the average temperature of said heating profile being less than the lower critical heating transformation temperature of said rod;
   (c) coiling said rod into a series of longitudinally spaced, repeating convolutions; and,
   (d) quenching said rod within less than about 15 seconds.

14. The method as defined in claim 13 wherein said rod has a diameter in the range of .300–.750 inch.

15. The method as defined in claim 13 wherein said rod is moved at a rate exceeding about 3.5 inches/second.

(References on following page)

References Cited

UNITED STATES PATENTS

| | | | |
|---|---|---|---|
| 1,783,764 | 12/1930 | Adams | 148—150 |
| 1,946,876 | 2/1934 | Northrup | 148—150 |
| 2,930,724 | 3/1960 | Rudd | 148—150 |
| 3,144,365 | 8/1964 | Ditson | 148—150 |
| 2,145,989 | 2/1939 | Merten | 148—12.4 |

RICHARD O. DEAN, Primary Examiner

U.S. Cl. X.R.

148—12.4, 39, 152, 153